Feb. 26, 1957 J. G. JOHNSON ET AL 2,783,064
QUICK DISCONNECT FLUID LINE COUPLING
Filed Nov. 17, 1953
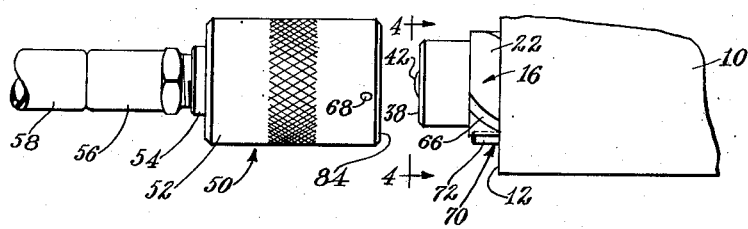
Fig. 3
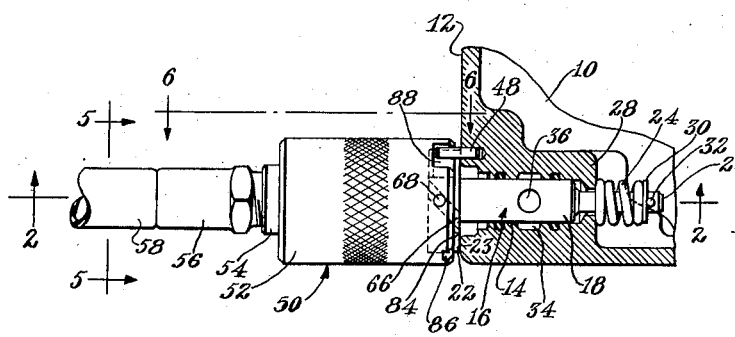
Fig. 1
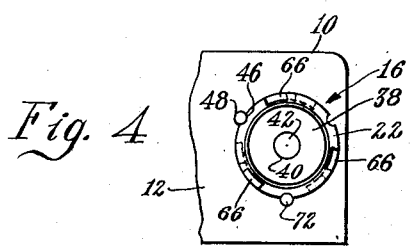
Fig. 4
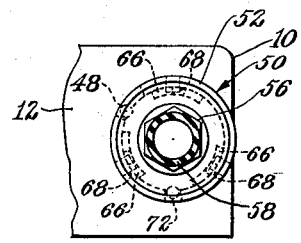
Fig. 5
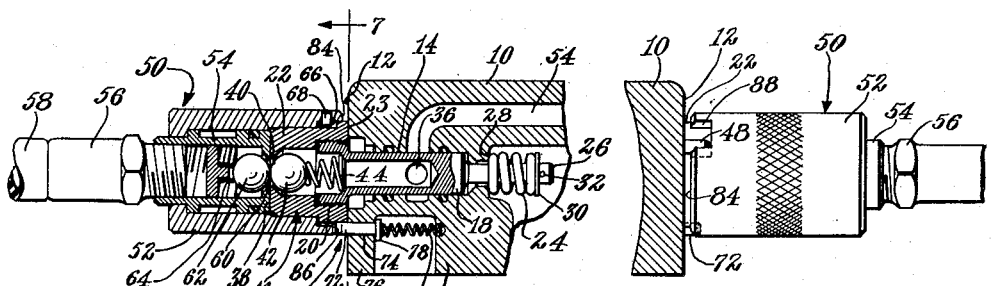
Fig. 2
Fig. 6
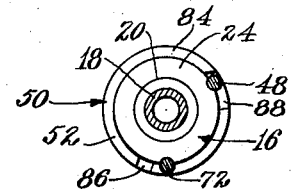
Fig. 7
INVENTORS
E. H. Fletcher & J. G. Johnson
BY
Attorneys

United States Patent Office 2,783,064
Patented Feb. 26, 1957

2,783,064

QUICK DISCONNECT FLUID LINE COUPLING

John G. Johnson, Waterloo, and Edward H. Fletcher, Cedar Falls, Iowa, assignors to Deere Manufacturing Co., Dubuque, Iowa, a corporation of Iowa Application November 17, 1953, Serial No. 392,573

4 Claims. (Cl. 285—1)

This invention relates to a fluid line coupling and more particularly to the type of coupling that is separable in response to excessive tensional forces imposed thereon. Still more particularly, the invention pertains to an improved means for locking the coupling parts against separation until separating forces of a predetermined magnitude are obtained.

A typical coupling of the general character referred to forms the subject matter of the U. S. Patent to Mitchell 2,509,444, the essential features of which are first and second coupling parts interconnectible by generally spiral ramp means that causes the coupling parts to move together as one coupling part is rotated relative to the other. One of the coupling parts is mounted in a support and is yieldably held against fore-and-aft movement, but the yielding means must yield when the parts are rotated relative to each other in order to enable the ramp means to operate. A pin projecting from the support engages a notch in the rotatable coupling part when rotation of the one coupling part has proceeded to a predetermined extent. One of the principal difficulties with this design is that the coupling action requires that the yieldable means be loaded during coupling, which requires considerable effort on the part of the operator, particularly when the couplings are equipped with self-sealing valves that must be unseated during the coupling process. The yielding means is adapted to yield in response to a predetermined tensional force applied to the coupling so that the pin will become disengaged from the notch, permitting reverse rotation of the coupling part for effecting disconnection thereof.

According to the present invention, a coupling of the general character referred to is improved by the provision of a floating or detent means that eliminates the necessity for compressing or otherwise loading the basic yielding means. Since the spring pressure on the detent means is considerably less than that on the coupling-biasing means, connection of the couplings is materially facilitated. A further object of the invention is to establish the detent means in a coupling without materially altering the basic nature of the coupling itself. Still further objects and important features inherent in and encompassed by the invention will become apparent as a preferred embodiment of the invention is described in the accompanying detailed description and illustrated in the drawings in which the several figures are identified below.

Fig. 1 is a plan view, partly in section, of the assembled coupling parts and illustrating the manner in which one coupling part is mounted in a support.

Fig. 2 is a sectional view as seen substantially along the line 2—2 of Fig. 1.

Fig. 3 is a side view, showing the coupling parts disconnected.

Fig. 4 is an end view of one of the coupling parts as seen along the line 4—4 of Fig. 3.

Fig. 5 is a rear sectional view as seen along the line 5—5 of Fig. 1.

Fig. 6 is a fragmentary sectional view from the opposite side as seen along the line 6—6 of Fig. 1.

Fig. 7 is a front view, partly in section, as seen along the line 7—7 of Fig. 2.

The coupling arrangement comprises a support part 10 having a rear face 12 and provided with a fore-and-aft extending bore 14 opening at the rear face. This bore axially receives a first coupling part, designated generally by the numeral 16, having a tubular shank 18 fitted into the bore 14 so that the coupling part may have fore-and-aft sliding movement relative to the support 10. The rear portion of the tubular shank 18 is enlarged and threaded, as at 20, and threaded onto the portion 20 is an enlarged rear cylindrical portion or head 22. For all pratical purposes, the portions 20 and 22 may be considered as one. An annular radial face 23 on the cylindrical portion 22 normally abuts the rear face or wall 12 of the support 10 and this normal position of the coupling part 16 is maintained by biasing means in the form of a relatively strong compression spring 24 carried by a forwardly projecting stem 26 integral with the tubular shank 18. The spring abuts an interior wall 28 of the support 10 and is retained by a washer 30 and pin 32.

The support 10 is provided with an interior fluid passage 34 that intersects the bore 14 and fluid communication between the passage 34 and the interior of the tubular shank 18 is effected by means of a plurality of openings or ports 36 in the tubular shank. These details are relatively unimportant but are set forth as one means of establishing fluid communication between the passage 34 and the fluid line of which the coupling part 16 forms a component.

The enlarged rear portion 22 of the coupling part 16 has a rear radial wall 38 apertured at 40 and providing an interior valve seat for a ball valve 42, which ball is yieldably held in aperture-closing relationship by a light compression spring 44.

The outer surface of the portion 22 of the coupling part 16 has a fore-and-aft directed notch 46 engaged by a rearwardly projecting pin or key 48 fixedly carried by the support 10. The pin, engaging with the notch 46, provides means for holding the first coupling part 16 against rotation relative to the support 10 and yet permits fore-and-aft shifting of the coupling part within limits, the coupling part being normally held in its forward position by the spring 24 and being yieldable rearwardly upon compression of the spring.

A second coupling part, designated generally by the numeral 50, is coaxially receivable by the first coupling part 16 in a manner to be presently described. The second coupling part comprises an external sleeve 52 having within its hollow interior a tubular member 54 that is internally threaded at its rear end to receive a fitting 56 on a flexible fluid line or hose 58. The forward end of the tubular member 54 is closed except for an aperture 60 that is controlled by a ball valve 62 urged by a relatively light compression spring 64 to a forward position closing the aperture 60. When the coupling parts are connected as shown in Fig. 2, the balls 42 and 62 mutually unseat each other to establish free fluid flow through the coupling. When the coupling parts are disconnected, the balls respectively close their associated openings to prevent the loss of fluid from the coupling parts, all of which is basically fundamental and forms no part of the present invention.

Connection of the coupling parts is accomplished by rotating the second coupling part relative to the first coupling part and disconnection is achieved by reversely rotating the second part. In order that the coupling action may be expeditiously effected, the coupling parts include generally spiral ramp means for causing the second coupling part to move forwardly onto the first coupling part as the second coupling part is rotated. This means includes a plurality of generally spiral slots 66 formed in a portion of the outer cylindrical surface of the first coupling part 16 and a plurality of cooperating pins or radial studs 68 carried by the forward portion of the second coupling part 50 in angularly spaced relationship according to the angular or circumferential spacing of the ramp slots 66. Thus, the second coupling part 50 assumes an initial position, disconnected from the first coupling part, as shown in Fig. 3. It is moved forwardly until the pins or studs 68 respectively engage the rear end portions of the ramp slots 66. After the studs are engaged with the respective ramps, the coupling part 50 is rotated to the right or in a clockwise direction as viewed from the rear and the shape and direction of the ramps are such that the coupling part moves forwardly onto the coupling part 16 in response to a predetermined amount of rotation from the aforesaid initial position. As is conventional, some means must be provided for preventing reverse rotation of the coupling part 50; otherwise, the coupling parts would not remain connected. On the other hand, whatever locking means is provided must be releasable in response to an excessive tensional force directed rearwardly on the coupling part 50 so that the parts may disconnect and thus avoid damage. Conventional locking means has heretofore taken the form of some kind of pin or its equivalent engageable with the coupling part 50 to prevent reverse rotation thereof until a rearward force on the hose line, or the coupling part itself, attains a predetermined magnitude. Such lock means is shown in the Mitchell patent referred to above. However, as pointed out above, connection of the coupling in that patent requires that the first coupling part be moved outwardly against its relatively heavy spring 24 as the coupling part 50 moves forwardly, because the forward movement of the coupling part 50 results in a drawing rearwardly of the coupling part 16. According to the present invention, this disadvantage is avoided by the provision of a floating or detent locking means, a detailed description of which will follow.

The improved detent or plunger means is designated generally by the numeral 70 and comprises a lock member or plunger 72 slidably carried for fore-and-aft movement in a small bore 74 in the rear portion of the support 10. This rear portion of the support 10 is in the form of a wall 76 beyond the forward face of which the plunger 72 projects, the plunger having at this face an enlarged head 78 which establishes a stop or limit means for preventing rearward separation of the plunger 72 from the support. The plunger is normally maintained in its rearwardmost projecting position by biasing means in the form of a relatively light compression spring 80 engaged between the head 78 and an interior portion 82 of the support 10. The plunger 72 is radially offset from the bore axis and is preferably on the same circle as the previously described fixed locking pin 48.

The forward portion of the sleeve 52 of the coupling part 50 includes means in the form of a front radial face 84 describing a circular portion of substantially the same diameter as the circle on which the members 48 and 72 lie. This front circular portion 84 is formed with a pair of angularly spaced forwardly opening notches or pockets 86 and 88 that ultimately receive the pins 72 and 48 respectively.

In considering the following description, it should be noted that Fig. 7 is not strictly a section on the line 7—7 of Fig. 2, because Fig. 7 illustrates the coupling part 50 before it is turned to its final locked position. When the coupling part is in its initial position (Figs. 3 and 7), the notch 86 is angularly offset from the pin or plunger 72; although, the pin or plunger 72 projects rearwardly to intersect the arc of movement of the notch 86. Consequently, as the coupling part 50 is moved forwardly to engage its studs 68 respectively with the spiral ramps 66, the unnotched portion of the front face 84 of the sleeve 52 will engage the stud 72 and depress it against its relatively light spring 80. Then, as the coupling part 50 is rotated and moves forwardly onto the coupling part 16, the pin or detent is further depressed until the notch 86 becomes alined with the plunger, whereupon the plunger will spring back into the notch and will thus serve as detent locking means for preventing reverse rotation of the coupling part 50. Since the plunger 72 may be depressed in the manner just stated, it is not required that the coupling part 16 be drawn rearwardly against its relatively heavier compression spring 24. Therefore, connection of the coupling parts is materially facilitated and very little effort is required as compared with the effort required in former designs.

The notch 88 in the front face 84 of the coupling part 50 is considerably wider than the notch 86 and is designed in that fashion to accommodate the fixed pin 48. The width of the notch 88 is such as to accommodate the pin 48 at all times. Hence, when the second coupling part 50 is rotated from its initial position to its locking position, the pin 48 is immediately received by the slot 88 but because of the width of the slot 88 the pin 48 constitutes no interference with rotation of the coupling part. Incidentally, the width of the notch 88 is an indication of the amount of rotation or angular movement required of the coupling part 50 to establish connection between the two coupling parts. The pin 48 serves no function in locking the coupling part 50 but retains its original function as means for preventing rotation of the coupling part 16. The pin 72, although a portion of its surface intersects a portion of the enlarged rear portion 24 of the coupling part 16, becomes depressed to such an extent that if it alone were relied upon to lock the coupling part 16, its position when fully forwardly depressed would possibly release the coupling part 16. Accordingly, the desirability of using the other pin or lock member 48 is established.

If the pin 72 were fixed as in the prior art, then engagement of the pin by the unnotched portion of the front face 84 of the coupling part 86 would cause the coupling part 16 to be drawn rearwardly as the studs 68 ride up the ramps 66, requiring compression of the spring 24. But, since the locking member or plunger 72 is in the form of a detent, it can yield and the coupling part 16 can remain fixed.

However, the yieldability of the coupling part 16 is important for the purposes of effecting disconnection of the coupling parts. For example, should an excess rearwardly directed force occur tending to pull the coupling parts apart, the first result would be a rearward shifting of the coupling parts in unison, opposed by the spring 24. As soon as sufficient movement occurred to clear the notch 86 of the pin 72, reverse rotation of the coupling part 50 would follow; that is to say, the studs 68 would then move outwardly and in a counterclockwise direction, as viewed from the rear, thus releasing themselves from the ramp 68 and permitting separation of the coupling parts, which separation is desirable from the standpoint of preventing damage to the hose 58 or to the coupling parts. As soon as the coupling parts separate, the respective ball valves 42 and 62 close and seal the coupling parts against the loss of fluid. The spring 24 draws the coupling part 16 back to its initial position with the front face 23 of the enlarged coupling portion 22 engaging the rear face 12 of the support part 10.

Various other features and specific objects not enumerated herein will undoubtedly occur to those versed in the art, as will many modifications and alterations in the preferred embodiment of the invention disclosed, all of which may be achieved without departing from the spirit and scope of the invention.

What is claimed is:

1. A fluid line coupling, comprising: a support having a rear face, a forward wall and a fore-and-aft bore opening rearwardly and forwardly respectively at said face and wall; a front coupling part axially slidably carried in the bore and having a rear head forwardly engageable with said face and an axial stem projecting forwardly ahead of said wall; resilient means ahead of said wall and acting between said wall and stem to bias said front coupling part forwardly to abut said head against said rear face; said head having a peripherally disposed fore-and-aft notch and said rear face having a rearwardly projecting key received in said notch to prevent rotation of the front coupling part relative to the support; a rear coupling part having a hollow forward sleeve coaxially receiving the head, said sleeve and head having interengageable generally spiral ramp means operative upon forward and reverse rotation of said sleeve to cause said sleeve to move respectively forwardly onto and rearwardly off of said head for respectively coupling and uncoupling said parts; said sleeve having a front radial face interrupted by first and second angularly spaced apart forwardly opening pockets, said first pocket accommodating the aforesaid key and having sufficient arcuate extent relative to said key as to enable rotation and reverse rotation of the sleeve free of said key; and detent means including a rearwardly projecting pin axially slidably carried by the support and normally projecting from said rear face to be received in the second pocket when said sleeve is fully rotated onto the front coupling part head, said pin preventing reverse rotation of the sleeve and consequent uncoupling of said parts until rearward movement of both parts in unison against the bias of the resilient means causes said second pocket to axially clear the pin, whereupon reverse rotation of the sleeve to its uncoupled position incurs angular misalinement between said second pocket and said pin, and spring means biasing the pin rearwardly and enabling forward yielding of said pin upon contact thereof by the front radial face of the uncoupled sleeve so that said sleeve may be rotated onto the front coupling part head to aline said pin and second pocket without loading the aforesaid resilient means.

2. A fluid line coupling, comprising: a support having a rear face, a forward wall and a fore-and-aft bore opening rearwardly and forwardly respectively at said face and wall; a front coupling part axially slidably carried in the bore and having a rear head forwardly engageable with said face and an axial stem projecting forwardly ahead of said wall; resilient means ahead of said wall and acting between said wall and stem to bias said front coupling part forwardly to abut said head against said rear face; said head having a peripherally disposed fore-and-aft notch and said rear face having a rearwardly projecting key received in said notch to prevent rotation of the front coupling part relative to the support; a rear coupling part having a hollow forward sleeve coaxially receiving the head, said sleeve and head having interengageable generally spiral ramp means operative upon forward and reverse rotation of said sleeve to cause said sleeve to move respectively forwardly onto and rearwardly off of said head for respectively coupling and uncoupling said parts; said sleeve having a front radial face interrupted by a forwardly opening pocket; and detent means including a rearwardly projecting pin axially slidably carried by the support and normally projecting from said rear face to be received in the pocket when said sleeve is fully rotated onto the front coupling part head, said pin preventing reverse rotation of the sleeve and consequent uncoupling of said parts until rearward movement of both parts in unison against the bias of the resilient means causes said pocket to axially clear the pin, whereupon reverse rotation of the sleeve to its uncoupled position incurs angular misalinement between said pocket and said pin, and spring means biasing the pin rearwardly and enabling forward yielding of said pin upon contact thereof by the front radial face of the uncoupled sleeve so that said sleeve may be rotated onto the front coupling part head to aline said pin and pocket without loading the aforesaid resilient means.

3. A fluid line coupling, comprising: a support having a rear face, a forward wall and a fore-and-aft bore opening rearwardly and forwardly respectively at said face and wall; a front coupling part axially slidably carried in the bore and having a rear head forwardly engageable with said face; resilient means acting between said support and said front coupling part to bias said front coupling part forwardly to abut said head against said rear face; said head having a peripherally disposed fore-and-aft notch and said rear face having a rearwardly projecting key received in said notch to prevent rotation of the front coupling part relative to the support; a rear coupling part having a hollow forward sleeve coaxially receiving the head, said sleeve and head having interengageable generally spiral ramp means operative upon forward and reverse rotation of said sleeve to cause said sleeve to move respectively forwardly onto and rearwardly off of said head for respectively coupling and uncoupling said parts; said sleeve having a front radial face interrupted by first and second angularly spaced apart forwardly opening pockets, said first pocket accommodating the aforesaid key and having sufficient arcuate extent relative to said key as to enable rotation and reverse rotation of the sleeve free of said key; and detent means including a rearwardly projecting pin axially slidably carried by the support and normally projecting from said rear face to be received in the second pocket when said sleeve is fully rotated onto the front coupling part head, said pin preventing reverse rotation of the sleeve until rearward movement of both parts in unison against the bias of the resilient means causes said second pocket to axially clear the pin, whereupon reverse rotation of the sleeve to its uncoupled position incurs angular misalinement between said second pocket and said pin, and spring means biasing the pin rearwardly and enabling forward yielding of said pin upon contact thereof by the front radial face of the uncoupled sleeve so that said sleeve may be rotated onto the front coupling part head, to aline said pin and second pocket without loading the aforesaid resilient means.

4. A fluid line coupling, comprising: a support having a rear face, a forward wall and a fore-and-aft bore opening rearwardly and forwardly respectively at said face and wall; a front coupling part axially slidably carried in the bore and having a rear head forwardly engageable with said face and an axial stem projecting forwardly ahead of said wall; resilient means ahead of said wall and acting between said wall and stem to bias said front coupling part forwardly to abut said head against said rear face; said head having a peripheral means cooperative between the support and front coupling part to prevent rotation of the front coupling part relative to the support; a rear coupling part having a hollow forward sleeve coaxially receiving the head, said sleeve and head having interengageable generally spiral ramp means operative upon forward and reverse rotation of said sleeve to cause said sleeve to move respectively forwardly onto and rearwardly off of said head for respectively coupling and uncoupling said parts; said sleeve having a front radial face interrupted by a forwardly opening pocket; and detent means including a rearwardly projecting pin axially slidably carried by the support and normally projecting from said rear face to be received in the pocket when said sleeve is fully rotated onto the front coupling part head, said pin preventing reverse rotation of the sleeve until rearward movement of both parts in unison against the bias of the resilient means causes said pocket to axially clear the pin whereupon reverse rotation of the sleeve to its uncoupled position incurs angular misalinement between said pocket and said pin, and spring means biasing the pin rearwardly and enabling forward yielding of said pin upon contact thereof by the front radial face of the uncoupled sleeve so that said sleeve may be rotated onto the front coupling part head to aline said pin and pocket without loading the aforesaid resilient means.

References Cited in the file of this patent

UNITED STATES PATENTS

| | | |
|---|---|---|
| 2,245,847 | Bagby | June 17, 1941 |
| 2,450,527 | Smith | Oct. 5, 1948 |
| 2,509,444 | Mitchell | May 30, 1950 |
| 2,709,093 | Zeeb | May 24, 1955 |